Nov. 22, 1949 A. S. WATKINS 2,488,786
INJECTION MOLDING APPARATUS
Filed Nov. 6, 1946

INVENTOR
Arthur S. Watkins
BY
Frederick Breitenfeld
ATTORNEY

Patented Nov. 22, 1949

2,488,786

UNITED STATES PATENT OFFICE 2,488,786

INJECTION MOLDING APPARATUS

Arthur S. Watkins, Walpole, N. H., assignor, by mesne assignments, to Produx Corporation, Port Clinton, Ohio, a corporation of Ohio Application November 6, 1946, Serial No. 708,138

12 Claims. (Cl. 18—30)

My present invention relates generally to injection molding apparatus.

The type of molding operation intended to be performed by the present apparatus is the well-known one in which a mass of plastic material is introduced under pressure into a mold cavity, the resultant article being removed from the mold after the material has hardened or set. It is a general object of my invention to provide an improved apparatus by means of which this procedure may be carried out with increased speed and efficiency, in conjunction with a plurality of molds which are successively used and reused.

More particularly, the invention relates to an improved feeding head through which plastic material can be expeditiously introduced, successively, into a series of molds, without any appreciable interruption of the material feed. In the commonly-employed "batch" procedure, it is necessary to interrupt the flow of the plastic material after a mold or molds have been filled, in order to allow time for the setting or curing of the injected material, and for removal of the molded article or articles. Such interruption is not only inefficient, but may cause difficulty by virtue of the hardening of the plastic material in the feeding apparatus. One way of obviating this difficulty consists in retarding the setting or curing time of the material, but this increases the intervals between successive uses of the mold.

It is of course desirable that a mold be used and reused as rapidly as possible, and with this objective in view, it is desirable that the plastic material injected into the mold be either of quick-setting quality, or that the curing process be partially completed at the time of injection. The present apparatus makes it possible to achieve these results with less likelihood of interruption due to premature or excessive setting of the material prior to its introduction into the mold.

In an apparatus of the present improved character, plastic material may be continuously introduced into a feeding cylinder, and subjected to a continuous advancement toward an injection nozzle, as the feeding head is caused to cooperate successively with a plurality of molds. The apparatus permits an accurate control of timing, and a continuous control of the temperature of the plastic material, whereby a plurality of molds may be successively used and reused at a greater speed, without interruption or impairment of smoothness of operation and uniformity of results.

The present improved feeding head consists, in brief, of a fixed annulus having a plurality of circumferentially spaced sprues, and a movable nozzle which is mounted for concentric rotation within the annulus, whereby it may be rotated intermittently to bring it successively into registry with said sprues. A plurality of molds are associated with the annulus, in receptive relationship to the sprues respectively. Whenever the nozzle is in registry with one of the sprues, it is momentarily brought to rest, and when the corresponding mold has been filled, the nozzle moves rapidly to the next sprue. Before it returns again, the material in the filled mold is permitted to set, the resultant article is removed, and the mold is re-adjusted to a closed and receptive relationship with respect to the sprue, in readiness to receive the next charge of plastic material.

One way of achieving these general objectives and advantages, and such other objects and advantages as may hereinafter appear or be pointed out, is illustratively exemplified in the accompanying drawings, in which.

Figure 1:
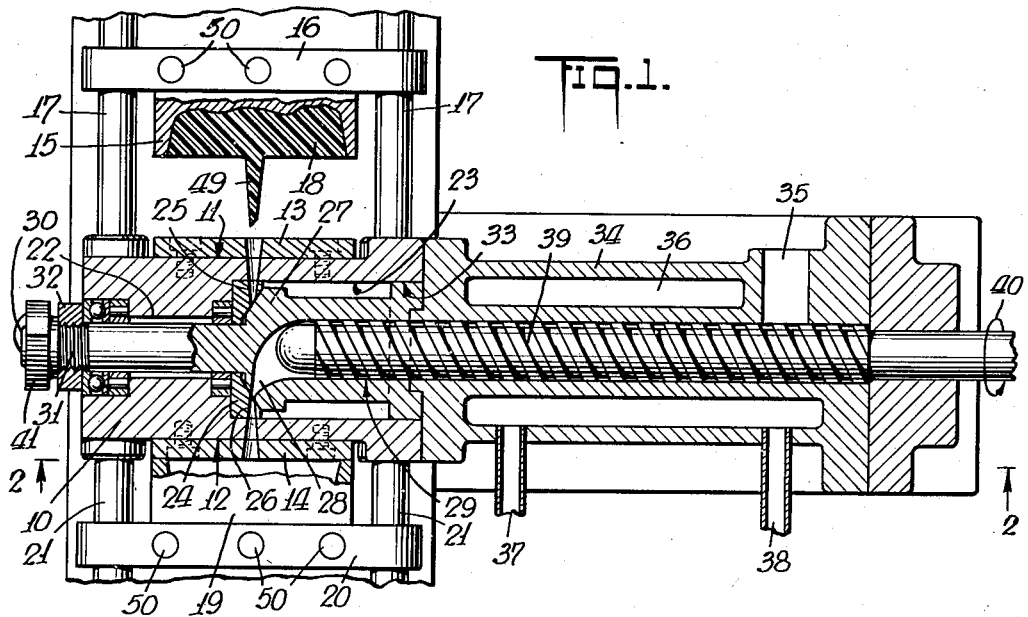
Figure 1 is a cross-sectional plan view of an injection molding apparatus embodying the features of the present invention, this view being taken substantially along the line 1—1 of Figure 2.

In the embodiment of the invention herein chosen for illustration, the apparatus is of the character which permits two sectional molds to be successively filled with plastic material. A casting 10 is provided with opposite faces 11 and 12 to which mold sections 13 and 14 are permanently secured. The section 13 constitutes part of a mold whose complementary section 15 is secured to a carrier 16 by means of which it may be moved toward and away from the section 13. The carrier 16 may be mounted on suitable guide rod or rails 17. In Figure 1, the sections 13 and 15 are shown in separated relationship, with a molded article 18 ready for removal from the mold. The section 14 similarly constitutes part of a mold whose complementary section 19 is secured to a carrier 20 by means of which it may be moved toward and away from the section 14. The carrier 20 may be mounted on suitable guide rods 21, and in Figure 1 the mold sections 14 and 19 are shown in their closed relationship, in readiness for the mold to receive a charge of plastic material.

Extending through the casting 10, in a direction substantially parallel to the faces 11 and 12, is a bore of circular cross-section, having the relatively narrow portion 22 and the relatively wider portion 23. Fixedly mounted at the inner end of the bore 23 is a ring or annulus 24, preferably composed of tool steel, having sprue openings 25 and 26 directed toward the mold sections 13 and 14 respectively. In an apparatus of the character illustrated, adapted to operate with two molds, the sprues 25 and 26 are circumferentially spaced so as to be 180° apart, as shown. The casting 10 and the mold sections 13 and 14, are provided with sprue openings in alignment with the sprues 25 and 26, respectively, and each composite sprue passageway flares outwardly, as shown.

The inner ends of the sprues 25 and 26 are arranged along a conical surface. Concentrically mounted with respect to the annulus 24 there is a rotatable nozzle 27 having a complementary conical surface. Communicating with this surface is the nozzle opening 28. The rear part of the nozzle passageway is axially disposed, as indicated at 29, and it will be noted that the forward part 28 is curved laterally toward the annulus 24.

The nozzle 27 is mounted for rotation along an axis concentric with the annulus 24. This is achieved by providing the nozzle with a stem or shaft 30 journaled within the bore 22, suitable roller bearings and a thrust bearing being mounted around this shaft to facilitate free rotation. At its end, the shaft 30 is preferably provided with a threaded portion 31 adapted to receive a nut 32 by means of which the conical surface on the nozzle may be retained in snug-fitting yet slidable relation to the conical surface of the annulus 24.

The smooth rotative movement of the nozzle 27 is further facilitated by the bearing contact which is afforded, as at 33, between the rear portion of the nozzle and the rear portion of the bore 23.

Secured to the casting 10 by any suitable means (not shown), and in alignment with the rear part 29 of the nozzle, is a feeding cylinder 34 having a feeding aperture 35 adjacent its rear end. This cylinder is preferably cored out, as at 36, to provide a chamber through which a temperature-controlling liquid, such as oil, may be passed. This liquid may, for example, be introduced through a conduit 37 and withdrawn through a similar conduit 38.

Mounted within the cylinder 34 is a worm conveyor 39 adapted to be rotated continuously in the direction of the arrow 40. Any suitable means may be employed for causing this rotation, such as a motor or other driving instrumentality (not shown).

It will be observed that the forward part of the conveyor 39 extends into the part 29 of the nozzle. Accordingly, when plastic material is introduced into the feeding aperture 25, the rotation of the conveyor 39 will advance this material forwardly to and through the nozzle 27, i. e., to and through the nozzle opening 28. Also by virtue of the friction between the plastic material and the wall of the nozzle 27, the nozzle is constantly subjected to a rotative force tending to rotate it in the direction of the arrow 40.

Figure 2:
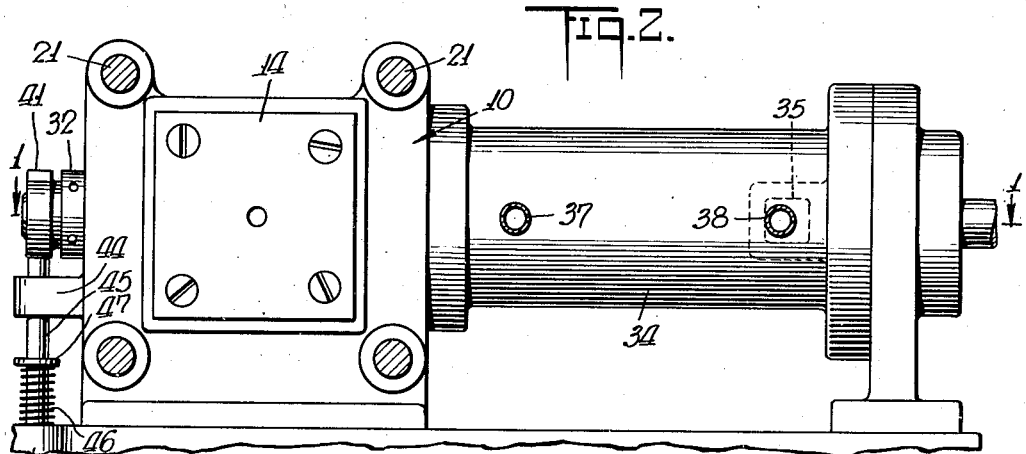
Figure 2 is an elevational view of the apparatus shown in Figure 1, taken substantially along the line 2—2 of Figure 1.

In accordance with my invention, a means is provided for momentarily locking the nozzle against rotation whenever the opening 28 is in alignment with one of the sprues in the annulus 24. One way of accomplishing this is shown most clearly in Figure 3. At the extreme end of the shaft 30, a collar 41 is secured, the peripheral surface conforming to two arcs which are eccentric to each other. This forms shoulders 42 and 43 which serve as detents. Mounted on the casting 10 is a guide bearing 44 within which a keeper 45 is reciprocable. A spring 46 pressing against a flange 47 on the keeper 45 tends normally to urge the keeper into the position shown in Figure 3. The opposite end of the keeper (i. e., the lower end as viewed in Figures 2 and 3) is constructed as the core of a solenoid 48, and is so associated with the solenoid coil that when the solenoid is energized (or de-energized as may be desired) the keeper 45 will be drawn against the action of the spring 46. In the position shown in Figures 2 and 3, the keeper 45 is in a position which is encountered by one or the other of the shoulders 42, 43, and the nozzle is thus locked against rotation. Obviously, when the keeper 45 is retracted against the action of the spring 46, the engaged shoulder is released, and the rotative force acting upon the nozzle will cause the latter to rotate until the next detent shoulder encounters and is stopped by the keeper 45.

Where the annulus 24 is provided with only two sprues, as in the illustrated construction, the detent element 41 is provided with two corresponding shoulders 42, 43. These shoulders are so positioned that when one or the other of them abuts against the keeper 45, the nozzle opening 28 will be accurately aligned with one or the other of the sprues 25, 26.

Figure 3:
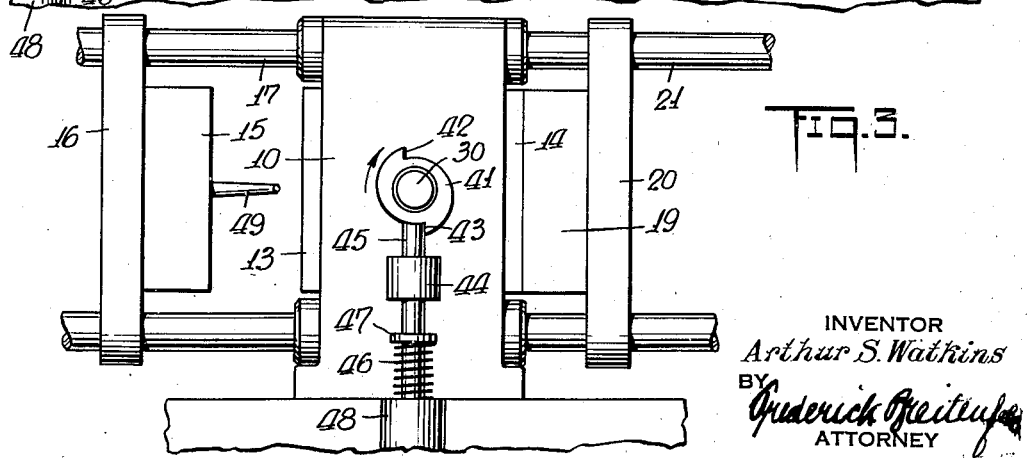
Figure 3 is an end view, taken from the left of Figure 2.

In operation, plastic material is continuously fed into the aperture 35, and the screw conveyor 39 is continuously rotated. Assuming that the parts are in the relationships shown in Figure 1, plastic material will be forcibly expelled through the nozzle opening 28 into and through the sprue 26, and into the mold composed of the sections 14 and 19. The nozzle is held against rotation by virtue of the abutment of the shoulder 43 against the keeper 45, as indicated in Figure 3. During this time, the other mold is made ready to receive a subsequent charge. Thus, the previously-molded article 18 is removed, and the mold section 15 is readjusted to a cooperative position with respect to the mold section 13. After a predetermined period of rest of the nozzle, depending upon the size and nature of the mold cavity, and the constituency and properties of the plastic material, the solenoid 48 is caused to operate momentarily to release the keeper 45 from the detent 43. The nozzle 27 thereupon rotates rapidly through 180°, its movement being stopped when the shoulder 42 encounters the keeper 45. The nozzle opening 28 is then in accurate alignment with the sprue 25, and the plastic material is immediately introduced through this sprue into the mold composed of the sections 13 and 15. During this time, the charge in the first mold has set, the mold has been opened and the resultant article removed, and the mold sections are returned to their closed relationship as shown in Figure 1. Then, as the solenoid 48 is again momentarily operated, the shoulder 42 is released and the nozzle 27 rotates rapidly back to the position of Figures 1 and 3. This procedure is repeated again and again, so that each of the molds is successively charged, emptied, and restored to receptive association with its corresponding sprue. At no time does the screw conveyor 39 cease rotating, and at no time is the plastic material subject to the likelihood of setting prematurely or excessively around the conveyor or within the nozzle.

Because of this continuous operation of the conveyor, it is possible to employ a plastic material of quick-setting properties and/or subject the plastic material to a pre-curing while it is being fed. This may be accurately controlled by the temperature of the liquid which is passed through the opening 36 in the feeding cylinder.

It should also be observed that there is at no time any impairment of operation as a result of material accumulated within either of the sprues. The tapered nature of each sprue causes the molded article 18 to carry with it the sprue part 49 when the mold sections are separated. The part 49 facilitates the removal of the article 18 from the mold, and is subsequently broken off or otherwise severed from the molded item.

If desired, each of the carriers 16 and 20 may be provided with electric heating units 50 by means of which the temperature of the molds may be regulated or controlled. Alternatively, it may be desirable under certain circumstances to provide a means for cooling the molds, e. g., by providing passages for cooling water or the like.

While not illustrated in the present drawings, it will be understood that the opening and closing of the molds may be automatically accomplished, if desired, e. g., by means of a double acting hydraulic cylinder or other source of motive power. If an automatic opening and closing of the molds is employed, it is actuated in accurate timed relation to the operation of the solenoid 48, as will be understood.

Although I have chosen to illustrate an apparatus in which there are only two molds to be fed in alternate relation, it will be understood that the apparatus may easily be modified to treat more than this number of molds. The only change required is in the shape of the casting 10, and in the provision of a suitable corresponding number of sprues arranged at circumferentially-spaced intervals, around the annulus 24. For each sprue, there will obviously be a corresponding detent provided on the element 41, in order that the nozzle will come to rest momentarily whenever its opening is in registry with one of the sprues.

In the preferred embodiment illustrated, the force tending to rotate the nozzle is produced by the frictional action of the plastic material itself. It will be understood, however, that any other motive power may be employed to impart a yieldable rotative movement to the nozzle, so that whenever it is released, it will swing freely to the next charging position.

Although I have shown the preferred employment of sectional molds, each composed of two sections, it will be understood that under certain circumstances molds of destructible one-piece character may be employed, or sectional molds having more than two sections may be used.

In general, it will be understood that those skilled in the art may readily make changes in the details herein described and illustrated without necessarily departing from the spirit and scope of the invention as expressed in the appended claims.

Having thus described my invention and illustrated its use, what I claim as new and desire to secure by Letters Patent is:

1. In an injection molding apparatus, a feeding head comprising a fixed annulus and a movable nozzle mounted for concentric rotation therein, said annulus being provided with a plurality of circumferentially spaced sprues, and means for rotating said nozzle intermittently to bring it successively into registry with said sprues, said means comprising a means constantly urging said nozzle to rotate, and means for intermittently engaging said nozzle to lock it against rotation.

2. In an injection molding apparatus, the combination set forth in claim 1, said nozzle having a rear part axially disposed, and said nozzle-rotating means comprising a screw conveyor adapted to feed plastic material and having its forward portion rotating within said rear part of the nozzle.

3. In an injection molding apparatus, the combination set forth in claim 1, said engaging means comprising at least one detent carried by said nozzle, and a movable keeper mounted for engagement and disengagement of said detent.

4. In an injection molding apparatus, the combination set forth in claim 1, said engaging means comprising at least one detent carried by said nozzle, a movable keeper mounted for engagement and disengagement of said detent, and electromagnetic means for moving said keeper.

5. In an injection molding apparatus, the combination set forth in claim 1, said nozzle having a rear part axially disposed, said nozzle-rotating means comprising a screw conveyor adapted to feed plastic material and having its forward portion rotating within said rear part of the nozzle, and said engaging means comprising at least one detent carried by the nozzle and a movable keeper mounted for engagement and disengagement of said detent.

6. In an injection molding apparatus, a feeding head comprising a fixed annulus and a movable nozzle mounted for concentric rotation therein, said annulus being provided with a plurality of circumferentially spaced sprues, said nozzle having a rear part axially disposed and a forward opening curved laterally toward said annulus, a non-rotative feeding cylinder mounted in alignment with said rear part of said nozzle, a rotating screw conveyor within said cylinder and having its forward end within said nozzle, whereby plastic material fed to the rear part of said cylinder will be advanced by said conveyor toward and through said nozzle, and whereby rotation of said conveyor will impart a rotative force to said nozzle, and means for momentarily locking said nozzle against rotation whenever its opening is in registry with one of said sprues.

7. In an injection molding apparatus, a feeding head comprising a fixed annulus and a movable nozzle mounted for concentric rotation therein, said annulus being provided with a plurality of circumferentially spaced sprues, a plurality of molds associated with said feeding head in receptive relation to said sprues respectively, said nozzle having a rear part axially disposed and a forward opening curved laterally toward said annulus, a non-rotative feeding cylinder in alignment with said rear part of said nozzle, said cylinder having a feeding aperture adjacent its rear end, a rotating screw conveyor within said cylinder and extending into said nozzle for advancing plastic material from said feeding aperture to and through said nozzle, the rotation of said conveyor imparting a constant rotative force to said nozzle, and means for intermittently engaging said nozzle to halt its rotation whenever its opening comes into registry with one of said sprues, whereby said nozzle becomes successively operative with respect to said molds while said conveyor is continuously rotated.

8. In an injection molding apparatus, the combination with the elements set forth in claim 7, of means for continuously regulating the temperature of the plastic material while it is in said cylinder.

9. In an injection molding apparatus, a feeding head comprising a fixed annulus having circumferentially-spaced substantially radial sprues therethrough, a casting adapted to support a plurality of molds on its exterior and having a bore within which said annulus is concentrically mounted, said casting having sprue openings aligned with said annulus sprues respectively, and a nozzle mounted in said bore for concentric rotation within said annulus and provided with an outlet opening adapted to register with said sprues as the nozzle is rotated.

10. In an injection molding apparatus, a feeding head as set forth in claim 9, said annulus having a conical inner surface, and the contacting surface of the nozzle being of corresponding conical shape.

11. In an injection molding apparatus, a feeding head as set forth in claim 9, said annulus having a conical inner surface, and the contacting surface of the nozzle being of corresponding conical shape, and adjustable means for retaining said conical surfaces in tight-fitting yet relatively slidable relationship.

12. In an injection molding apparatus, a feeding head comprising a fixed annulus and a movable nozzle mounted for concentric rotation therein, said annulus being provided with a plurality of circumferentially spaced sprues, said nozzle having its rear intake part axially disposed and its forward outlet or feeding opening curved laterally toward said annulus, a screw conveyor adapted to feed plastic material and having its forward portion rotating concentrically within said rear part of the nozzle, whereby the friction of the plastic material urges the nozzle to rotate, and means for intermittently engaging said nozzle to lock it against rotation whenever its feeding opening is in registry with one of said sprues.

ARTHUR S. WATKINS.

REFERENCES CITED

The following references are of record in the file of this patent:

UNITED STATES PATENTS

| Number | Name | Date |
|---|---|---|
| 133,229 | Hyatt | Nov. 18, 1872 |
| 1,784,146 | Leis | Dec. 9, 1930 |
| 2,239,338 | Norelli | Apr. 22, 1941 |